United States Patent [19]
Nam

[11] Patent Number: 6,104,555
[45] Date of Patent: Aug. 15, 2000

[54] METHOD AND DEVICE FOR DUPLICATING AN INITIAL PROGRAM OF A HARD DISK DRIVE

[75] Inventor: Chang-Woo Nam, Gumi, Rep. of Korea

[73] Assignee: SamSung Electronics Co., Ltd., Suwon, Rep. of Korea

[21] Appl. No.: 09/010,820

[22] Filed: Jan. 22, 1998

[30] Foreign Application Priority Data

Jan. 22, 1997 [KR] Rep. of Korea ................ 97/1754

[51] Int. Cl.[7] .................... G11B 5/86; G11B 3/64
[52] U.S. Cl. ........................... 360/15; 369/85
[58] Field of Search .............. 360/15, 48; 369/85; 395/712

[56] References Cited

U.S. PATENT DOCUMENTS

| | | |
|---|---|---|
| 4,736,341 | 4/1988 | Redmond et al. ............... 364/900 |
| 4,980,783 | 12/1990 | moir et al. ............... 360/77.02 |
| 5,430,845 | 7/1995 | Rimmer et al. ............... 395/275 |
| 5,465,343 | 11/1995 | Henson et al. ............... 395/439 |
| 5,530,602 | 6/1996 | Boutaghou et al. ............... 360/75 |
| 5,652,863 | 7/1997 | Asensio et al. ............... 395/497.04 |
| 5,842,024 | 11/1998 | Choye et al. ............... 395/712 |

*Primary Examiner*—W. Chris Kim
*Attorney, Agent, or Firm*—Robert E. Bushnell, Esq.

[57] ABSTRACT

A device for copying programs installed on an original hard disk drive into duplicating hard disk drives is disclosed. The storage area of an original HDD is divided into a plurality of sub-storage areas corresponding to different HDD models so as to store initial programs corresponding to the different HDD models in respective sub-storage areas. Thereby, the above original initial programs corresponding to the different HDD models are copied into respective duplicating HDDs.

10 Claims, 5 Drawing Sheets

6,104,555

METHOD AND DEVICE FOR DUPLICATING AN INITIAL PROGRAM OF A HARD DISK DRIVE

CLAIM OF PRIORITY

This application makes reference to, incorporates the same herein, and claims all benefits accruing under 35 U.S.C. § 119 from an application for *METHOD AND DEVICE FOR DUPLICATING INITIAL PROGRAM OF THE HARD DISK DRIVE* earlier filed in the Korean Industrial Property Office on the 22$^{nd}$ of January 1997 and there duly assigned Serial No. 1754/1997.

BACKGROUND OF THE INVENTION

1. Technical Field

The present invention relates to a hard disk drive, and more particularly to a method and device for copying programs installed on the original hard disk drive into uninitialized hard disk drives.

2. Related Art

Generally, the hard disk drive (HDD) consists of a head/disk assembly (HDA) comprising mechanical constituent elements and a printed circuit board (PCB) comprising circuit elements, whereby a large amount of data can be magnetically stored on the disks and accessed at a great speed. Thus, such an arrangement is widely used as an auxiliary storage device for a computer system.

When duplicating the original HDD having a large number of installed programs, it takes a lot of time and manpower because disks must be installed after being formatted. Therefore, a method is employed, whereby the original HDD is copied into duplicating HDDs from sector to sector without performing the process of disk formatting and the initial program installation, but such a conventional method is possible only when the model of the duplicating HDDs is the same as that of the original HDD.

However, since the original and duplicating HDDs must be always of the same model and capacity when using the method referred to above and described in more detail below, there is a drawback in that the quantity of different original HDDs are required to be equal to the different models and capacities of the duplicating HDDs to be copied. This results in considerable expense.

Moreover, a further drawback resides in the fact that productivity deteriorates in implementation of the method referred to above because, when the models and capacities of the original and duplicating HDDs turn out to be different after mounting the duplicating HDD, the original HDD must be replaced with another one appropriate to the model and capacity of the duplicating HDD. This results in loss of time as well as further expense.

Therefore, there is a need in the prior art for development of an original HDD having a storage area divided into subareas which are equal in number to the number of different models of HDDs. There is also a need in the prior art for development of a method for dividing the storage area of an original HDD into sub-storage areas equal in number to the number of different models of HDDs so as to store the initial program of each of the sub-storage areas. Moreover, such a method should result in copying of the initial program from the sub-storage area into the appropriate duplicating HDDs when mounting a plurality of duplicating HDDs of different models.

The following patents are considered to be representative of the prior art relative to the present invention, and are burdened by the disadvantages discussed above, as well as additional disadvantages discussed herein: U.S. Pat. No. 5,652,863 for a *Graphical Method Of Media Partitioning On A Hard Disk* to Asensio et al., U.S. Pat. No. 5,530,602 for a *Disk Drive micromotion Starting Apparatus And Method* to Boutaghou et al., U.S. Pat. No. 5,465,343 for a *Shared memory Array For Data Block And Control Program Storage In Disk Drive* to Henson et al., U.S. Pat. No. 5,430,845 for a *Peripheral Device Interface For Dynamically Selecting Boot Disk Device Driver* to Rimmer et al., U.S. Pat. No. 4,980,783 for an *Apparatus For Automatically Applying Servo Track Data To A Selected Servo Surface Of A Hard Disk Within A Hard Disk Assembly* to Moir et al., and U.S. Pat. No. 4,736,341 for an *Intelligent Hard Disk Drive Subsystem* to Redmond et al.

SUMMARY OF THE INVENTION

Accordingly, it is an object of the present invention to provide an original HDD, the storage area of which is divided into subareas equal in number to the number of different models of HDDs, whereby each sub-storage area stores the initializing program.

It is another object of the present invention to provide a method for dividing the storage area of an original HDD into sub-storage areas equal in number to the number of different models of HDDs so as to store the initial program in each of the sub-storage areas and copy the initial programs from the sub-storage areas, each corresponding to the respective HDD models, into the appropriate duplicating HDDs when mounting a plurality of duplicating HDDs of different models.

The inventive device for copying the initialization program from an original HDD into the duplicating HDDs of different models is characterized in that the data storage area of the above single original HDD is divided into a plurality of sub-storage areas equal in number to the number of HDD models, each subarea storing an initialization program corresponding to the respective HDD models, so that the appropriate initialization program corresponding to the same HDD model can be copied into the respective duplicating HDDs.

The present invention will now be described more specifically with reference to the preferred embodiment and the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
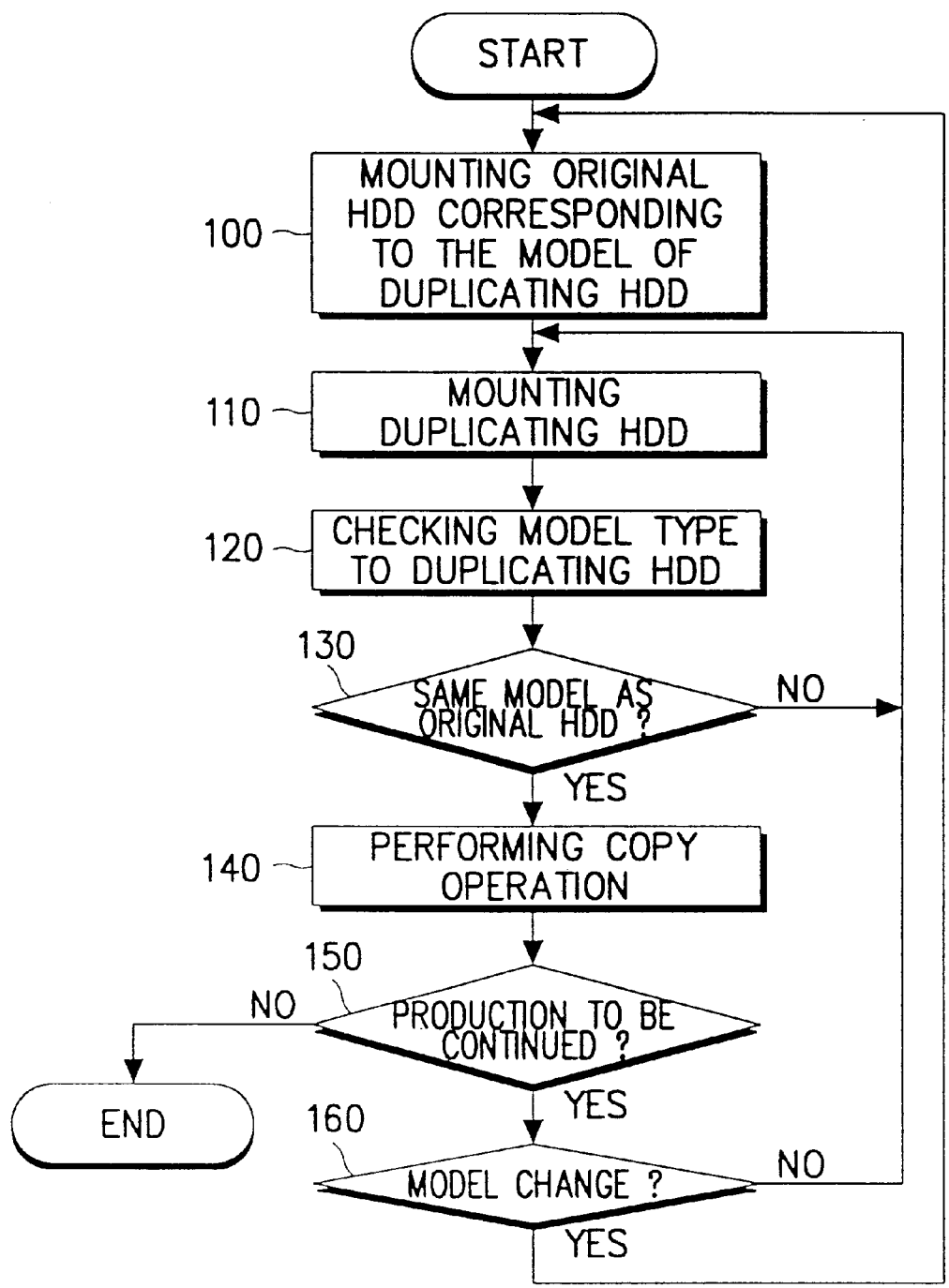
FIG. 1 is a flow chart illustrating a method for controlling the procedure for copying the initialization program of an original HDD.

To explain a method for copying the initializing program of HDDs in detail, FIG. 1 illustrates the control procedure for duplicating the HDD initialization. In step 100, the original HDD of the same model as the duplicating HDDs is mounted on the host computer. Then, in step 110, the duplicating HDDs are mounted on the host computer. Thereafter, in steps 120 and 130, the host computer checks whether the models and capacities of the duplicating HDDs are the same as those of the host computer. If both of the original and duplicating HDDs are different in model and capacity, the host computer repeats step 110 by substituting another duplicating HDD. However, when the models and capacities of the HDDs are the same, the host computer proceeds to step 140 to copy the contents of the original HDD into the duplicating HDD. Then, the host computer proceeds to step 150 to detect the continuation command for further production. If the continuation command is detected, the operation is terminated. If the continuation command is detected, the host computer proceeds to step 160 to check the HDD model change command from the user. If a model change command is detected, the process returns to step 100 to repeat the subsequent steps; if the HDD model change command is not detected, the host computer returns to step 110 to repeat the subsequent steps.

However, since the original and duplicating HDDs must be always of the same model and capacity when applying the above duplicating method, the method has a drawback in that as many different original HDDs are required as there are different models and capacities of duplicating HDDs to be copied, and this results in considerable expense.

Another drawback is that productivity deteriorates because, when the models and capacities of the original and duplicating HDDs turn out to be different after mounting the duplicating HDD, the original HDD must be replaced with another one appropriate to the model and capacity of the duplicating HDD.

Figure 2:
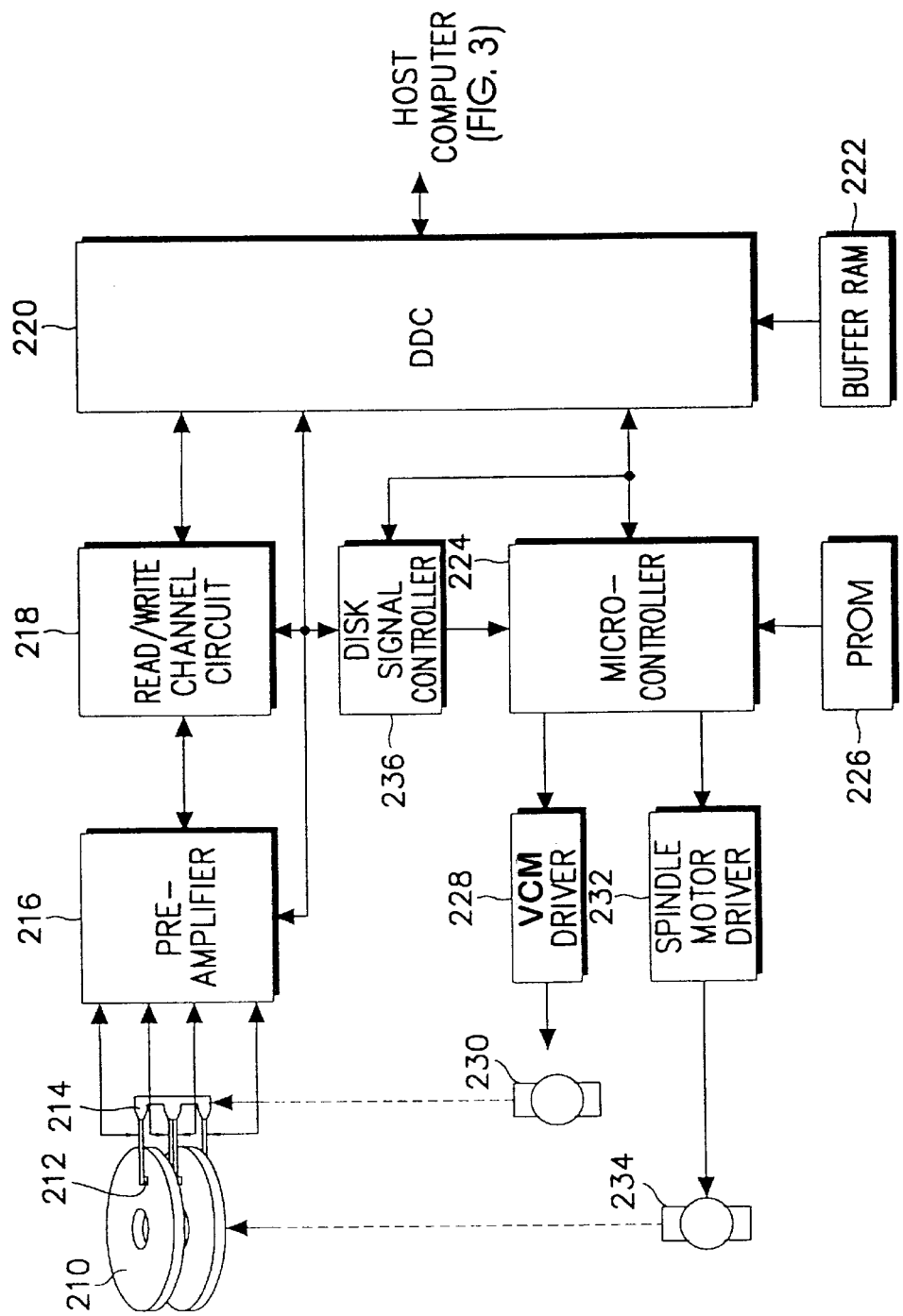
FIG. 2 is a block diagram illustrating the generally used original hard disk drive to which the present invention is applied.

Referring to FIG. 2, the disks 210 are rotated by the spindle motor 234. The magnetic heads 212 are each positioned over the corresponding disk surfaces, respectively, each being mounted on a corresponding support arm extending toward the disks 210 and perpendicularly from the E-block assembly 214 connected to the rotary voice coil actuator 230.

When reading, the preamplifier 216 amplifies the read signals picked up by one of the heads 212 and applies the resulting analog read signal to the read/write channel circuit 218. When writing data, the preamplifier 216 activates a corresponding one of the heads 212 to write the encoded write data applied by/from the read/write channel circuit 218 onto the corresponding disk 210.

The read/write channel circuit 218 detects and decodes data pulses from the read signal applied by/from the preamplifier 216, applies the resulting signal to the disk data controller (DDC) 220, and decodes the write data applied by/from the DDC 220 for further application to the preamplifier 216.

The DDC 220 writes the data received from the host computer onto the disks 210 through the read/write channel circuit 218 and the preamplifier 216, and interfaces communications between the host computer and the microcontroller 224.

The buffer random access memory (RAM) 222 temporarily stores data transferred between the host computer, the micro controller 224, and the read/write channel circuit 218. The microcontroller 224 controls the DDC 220 in response to read/write instructions received from the host computer, and further controls the track seeking and following operations.

The programmable read-only memory (PROM) 226 stores the executive program of the microcontroller 224 and various setup values. The VCM driver 228 generates the drive current for driving the actuator 230 in response to a control signal generated by the microcontroller 224 so as to control the positions of the heads 212, and further applies drive current to the voice coil of the actuator 230. The actuator 230 moves the heads 212 over the disks 210 in response to the level and direction of the drive current.

The spindle motor driver 232 drives the spindle motor 234 so as to rotate the disks 210 under the control of the microcontroller 224. The disk signal controller 236 generates various timing signals required for read/write operations under the control of the microcontroller 224, and decodes the servo data for further application to the microcontroller 224.

Figure 3:
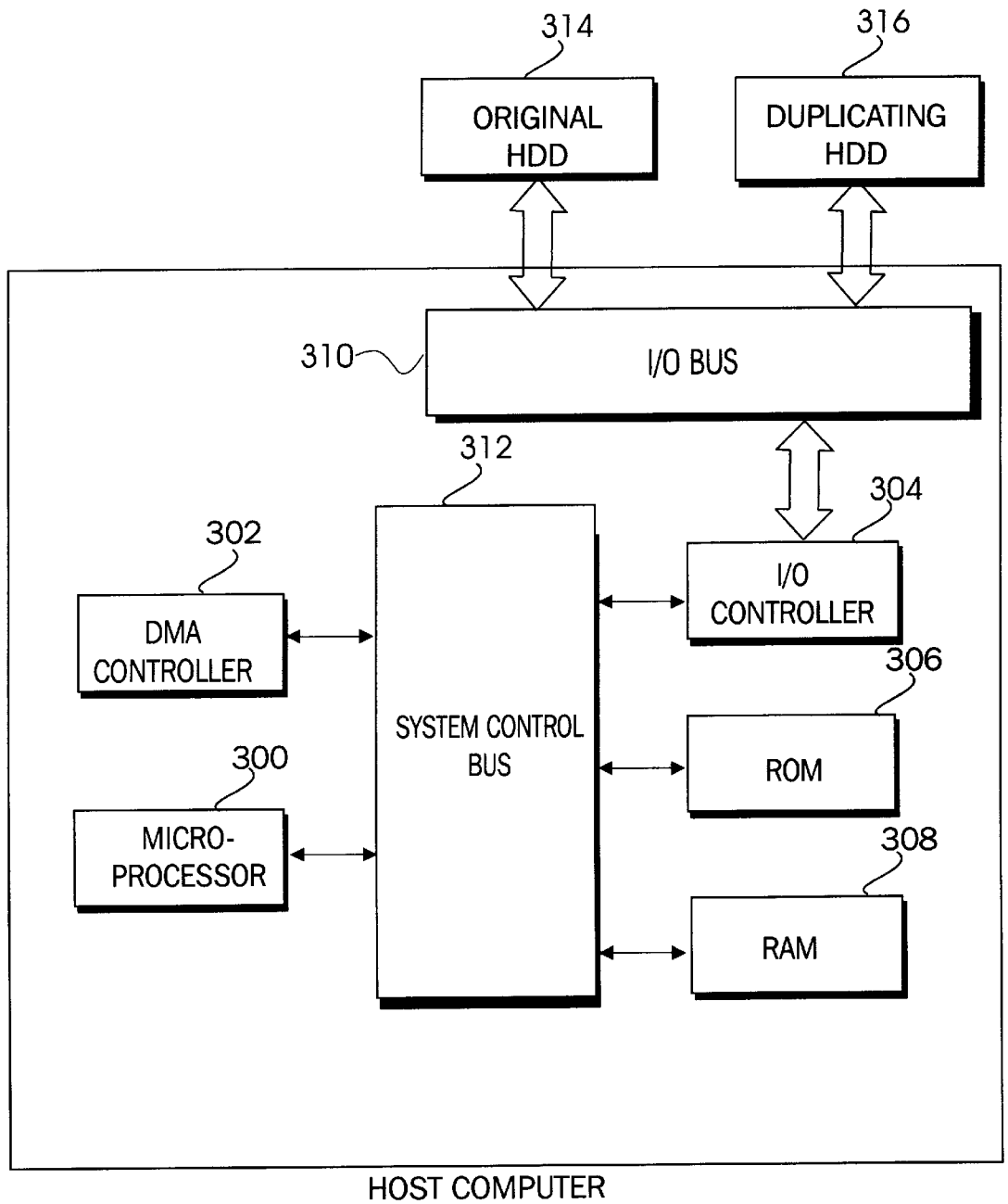
FIG. 3 is a block diagram illustrating the general host computer to which the present invention is applied.

Referring to FIG. 3 illustrating the constituent elements of the general host computer, the microprocessor 300 performs overall control operations within the host computer. The ROM 306 and the RAM 308 constitute the memory units which store the executive program and various information for implementing the present invention. The direct memory access (DMA) controller 302 enables the transfer of data between the above memory unit and the I/O controller 304 of the input/output device without processor intervention. The system control bus 312 is a control channel through which the control signals and data signals are carried between the microprocessor 300 and the related peripheral devices.

Accordingly, when copying the initial programs into the uninstalled duplicating HDDs by using the above original HDD, the host computer shown in FIG. 3 controls the microcontroller 224 shown in FIG. 2 so as to perform the copying operation, thereby storing the necessary executive program and various information in the main memory within the host computer.

Figure 4:
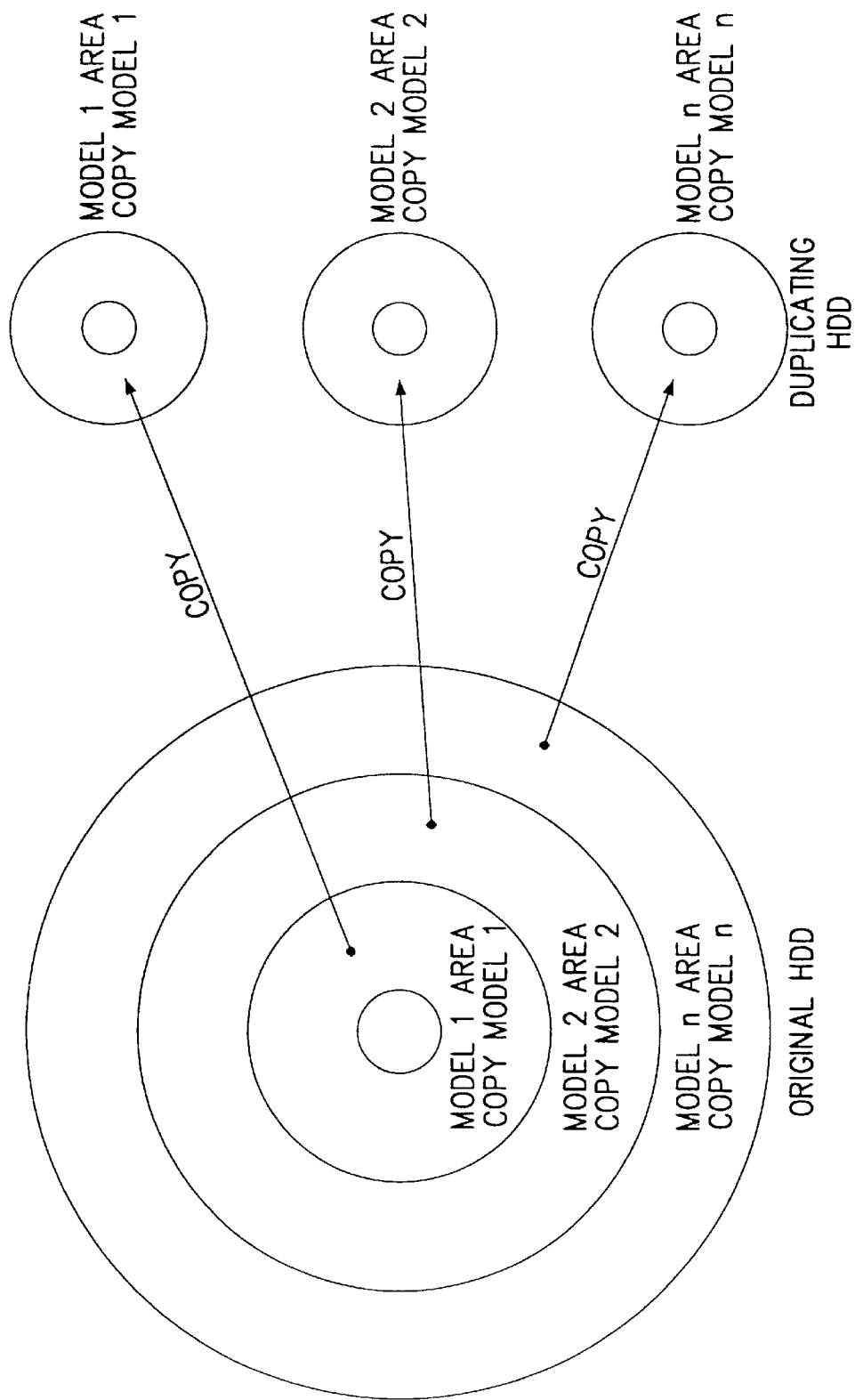
FIG. 4 is a schematic diagram for illustrating the inventive method for copying the initialization program of the HDD according to an embodiment of the present invention.

Under the above arrangement, the HDD shown in FIG. 2 is an original HDD having initial programs to be copied, and the magnetic storage area thereof is configured as depicted in FIG. 4. Thus, the above storage area is divided into a plurality of sub-storage areas equal in number to the number of models of the duplicating HDDs, each area storing respective program corresponding to a specific model. When performing copying operations by connecting a plurality of duplicating HDDs, the initial programs stored in the sub-storage areas are each copied into the respective duplicating HDDs corresponding to the HDD models.

Figure 5:
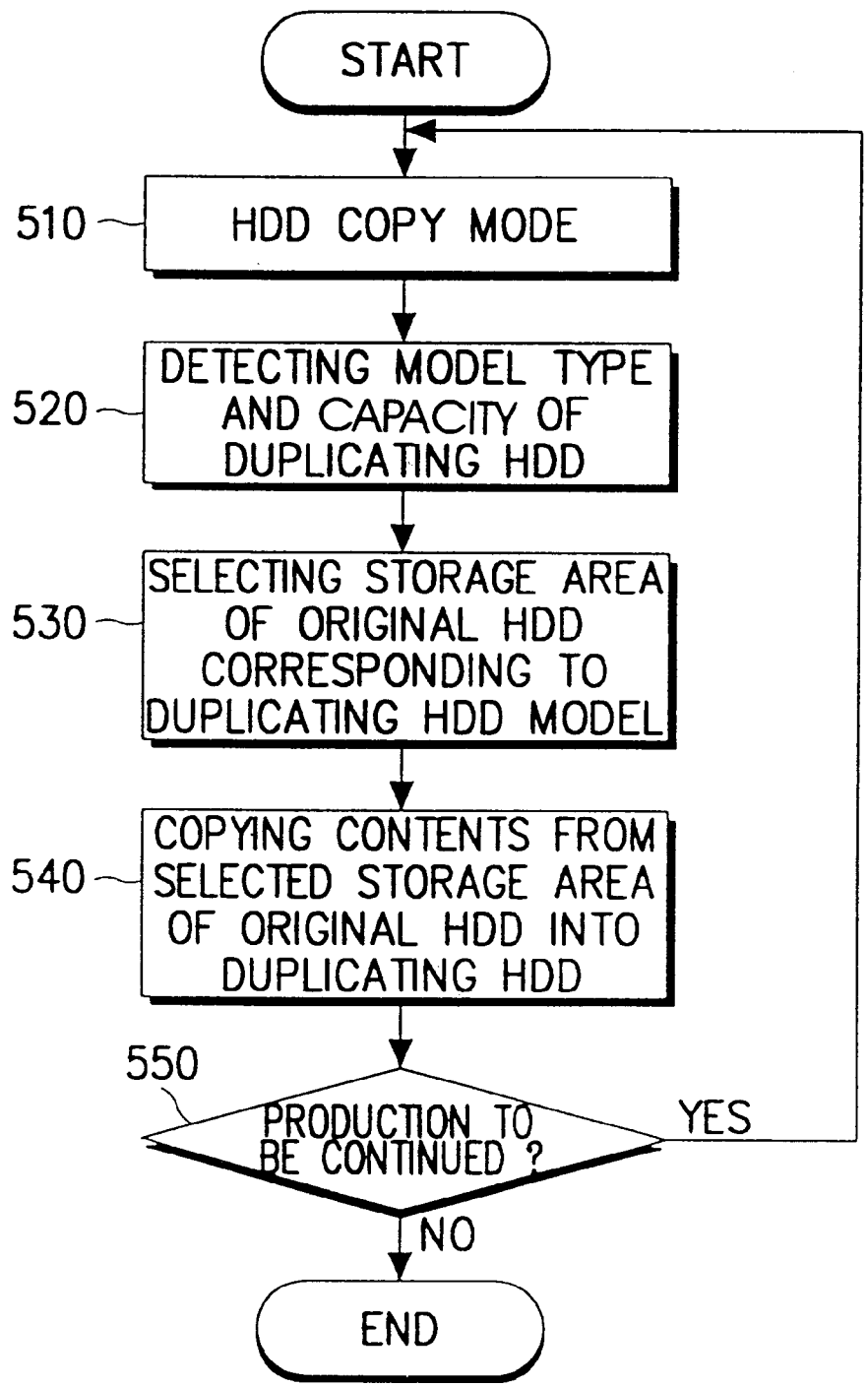
FIG. 5 is a flow chart for illustrating the inventive method for controlling the procedure for copying the initialization program of an original HDD.

To describe in detail an embodiment of the present invention with reference to FIGS. 2–5, the duplicating HDDs are first connected with the original HDD having a magnetic recording medium formatted as shown in FIG. 4 through the instrumentality of the host computer. Thereafter, the host computer initiates a copy mode for duplicating the uninstalled HDDs in step 510 (FIG. 5). Then, in step 520, the host computer detects the model type and capacity of the duplicating HDDs. In steps 530 and 540, the host computer reads data from the sub-storage areas corresponding to the respective models and capacities of the duplicating HDDs, and copies the retrieved data into the magnetic disk of the duplicating HDDs. In step 550, upon failing to detect the continuous production command, the host computer terminates the copy operation; however, when the continuous production command is detected, the host computer proceeds to step 510 and the subsequent steps.

As described above, the present invention provides an original HDD in which the storage area of the HDD is divided into a plurality of sub-storage areas equal in number to the number of HDD models so as to store the original initial programs corresponding to the specific HDD models in each of the respective sub-storage area. The invention also provides a method for copying the original initial programs corresponding to the specific HDD models into the respective duplicating HDDs, which can consequently reduce production cost and improve the productivity.

What is claimed is:

1. A device for copying original initial programs into the duplicate hard disk drives of different models connected to an original hard disk drive, said device comprising a recording medium in which a data storage area of said original hard disk drive is divided into a plurality of sub-storage areas corresponding to said different hard disk drive models, each sub-storage area having a respective initial program corresponding to a respective model written thereon and stored therein.

2. A method for duplicating hard disk drives, comprising the steps of:

dividing a storage area of an original hard disk drive into a plurality of sub-storage areas corresponding to different hard disk drive models;

storing the initial programs corresponding to the different hard disk drive models in respective ones of said sub-storage areas;

detecting a model type of each of a plurality of duplicate hard disk drives connected to said original hard disk drive; and copying initial programs corresponding to each of said detected model types of said plurality of duplicate hard disk drives from said original hard disk drive into a respective one of said plurality of duplicate hard disk drives.

3. A method as recited in claim 2, wherein said detecting step further comprises detecting a capacity of each of said plurality of duplicate hard disk drives connected to said original hard disk drive.

4. A device for copying original initial programs from an original hard disk drive into duplicate hard disk drives of different models connected to said original hard disk drive, said device comprising:

storage means for storing said original initial programs, said storage means comprising a plurality of sub-storage areas, each of said sub-storage areas corresponding to a respective one of different hard disk drive models, each said sub-storage area storing a respective one of said initial programs corresponding to a respective one of said different hard disk drive models;

means for detecting a model type of each of said duplicate hard disk drives;

means responsive to detection of said model type of each of said duplicate hard disk drives for selecting a corresponding one of said sub-storage areas storing said respective initial program corresponding to said detected model type; and means for copying the contents of said corresponding one of said selected sub-storage areas into said duplicate hard disk drive of said detected model type.

5. A device as recited in claim 4, wherein said detecting means additional detects a capacity of each of said plurality of duplicate hard disk drives connected to said original hard disk drive, wherein said selecting means performs its selection operation based on the capacity of said each of said plurality of duplicate hard disk drives detected by said detecting means.

6. A method for duplicating hard disk drives, comprising the steps of:

detecting at least one of a model type and a capacity of a duplicating hard disk drive;

selecting a storage area of an original hard disk drive corresponding to said at least one of said model type and said capacity of said duplicating hard disk drive; and copying contents of said selected storage area of said original hard disk drive into said duplicating hard disk drive.

7. A method as recited in claim 6, further comprising the step, prior to said detecting step, of establishing a hard disk drive copy mode.

8. A method as recited in claim 6, wherein said at least one of said model type and said capacity of said duplicating hard disk drive comprises the model type and the capacity of said duplicating hard disk drive.

9. A device for duplicating hard disk drives, comprising:

detecting means for detecting at least one of a model type and a capacity of a duplicating hard disk drive;

a storage area of an original hard disk drive, including sub-storage areas corresponding to at least one of different models and different capacities of duplicating hard disk drives;

selecting means responsive to said detecting means for selecting one of said sub-storage areas in correspondence to said at least one of said model type and said capacity of said duplicating hard disk drive; and copying means responsive to said selecting means for copying contents of said selected sub-storage area of said original hard disk drive into said duplicating hard disk drive.

10. The device as recited in claim 9, wherein said at least one of said model type and said capacity of said duplicating hard disk drive comprises the model type and the capacity of said duplicating hard disk drive.

* * * * *